United States Patent Office 3,084,107
Patented Apr. 2, 1963

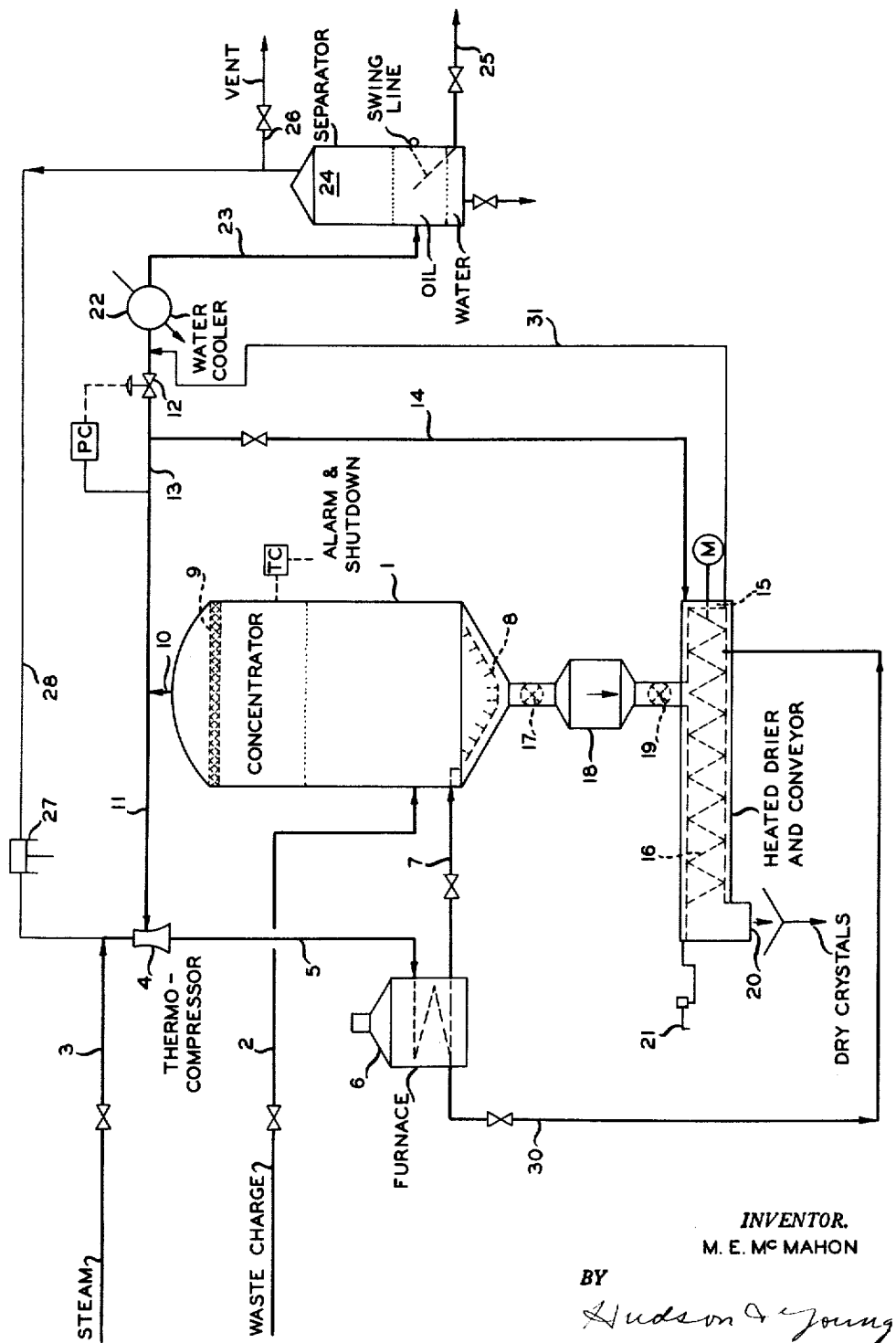

3,084,107
WASTE DISPOSAL METHOD AND APPARATUS
Martin E. McMahon, Bartlesville, Okla., assignor to Phillips Petroleum Company, a corporation of Delaware
Filed Mar. 13, 1959, Ser. No. 799,249
4 Claims. (Cl. 202—48)

This invention relates to waste disposal. In one of its aspects, the invention relates to a method of waste disposal by passing waste in substantially fluid form into a concentrator, therein stripping from the waste vapors, heating at least a portion of said vapors and using the thus heated vapors as stripping medium, passing a portion of the vapors to condensation and recovery and/or passing a portion of said vapors to a heated drying zone through which bottoms from which the vapors have been stripped (from waste material) are conveyed, thus obtaining an essentially dry concentrate. In another of its aspects, the invention relates to an apparatus comprising, in combination, at least the following means: means for concentrating a waste, means for removing vaporous waste material from said means for concentrating, means for passing thus removed vapors through a heater means, a heater means for heating said vapors, means coacting with said means for removing vaporous material from said means for concentrating adapted to release at least a portion of said vapors, means for cooling said released portion of vapors, and means for separating phases, such as oil and water phases, obtained from said cooling means. In a further aspect of the invention, the apparatus comprises means coacting with said means for concentrating adapted to receive sludge-like concentrate from said means for concentrating and to convey said means while heating said means so that there is obtained an essentially dried concentrate.

The problem of waste disposal and/or pollution abatement is a real one. The problem involves expenditure of millions of dollars annually. Every effort is being made currently to cut down the cost of maintaining waste disposal and/or pollution abatement operations. Clearly, there are many wastes, the recovery of which does not begin to pay the cost of their recovery. Therefore, there is real need for a cheaply installed and cheaply operated method and apparatus to dispose of wastes or to abate pollution. The handling of wastes is a highly specialized art and many schemes have been proposed. However, the problem still figures importantly in most plants and one place costs are continually sought to be cut is in the waste disposal or pollution prevention or abatement.

Furthermore, in the operation of equipment and method as here discussed, the obtaining of products from the treatment of wastes or in preventing pollution, in such a form as to be readily further handled, is very desirable. However, the obtaining of the products in readily handled form must be done with economy, without unduly wearing and tearing the equipment or using such a method and/or equipment that not much, if any unskilled or skilled labor is required in the operation and supervision of operation of the plant.

I have now conceived of a waste disposal combination of steps and apparatus from which there can be obtained simultaneously or alternatively, as desired, an essentially dry waste concentrate using only that heat to obtain said dry concentrate which is furnished to the concentrator while at the same time obtaining a liquid condensate, in the form of separate phases where two or more phases are present, which condensate represents vaporizable constituents of the waste.

An object of this invention is to provide a method for the disposal of waste. Another object of this invention is to provide an apparatus for the disposal of waste. A further object of this invention is to provide waste disposal means and method of improved economy of installation and/or operation and maintenance. A still further object of the invention is to provide method and means for recovery of various chemical and other refining wastes. It is still a further object of this invention to recover concentrates from a waste disposal system in an essentially dry form using only a minimum of heat limited to that heat which is required in the concentration of the wastes. In a still further object of the invention, it provides means and method for obtaining in a unitary system an essentially dry or crystalline concentrated waste.

Other aspects, objects and the several advantages of this invention are apparent from a study of this disclosure, the drawing and the appended claims.

According to this invention, there is provided a method of treating waste material containing a vaporizable portion to obtain a dried, readily handled concentrated product therefrom which comprises passing a heated stripping fluid through said material, thus obtaining a concentrate, and passing vapors obtained by passing said fluid through said material into heat exchange relationship with said concentrate to heat the said concentrate. Preferably, the concentrate is removed from the zone in which stripping fluid is passed therethrough and, following such removal, is directly contacted with hot vapors obtained by passing said fluid through said material to strip vapors therefrom.

Further, according to the invention, there is provided a method for the recovery of products from wastes which comprises heating a fluid, passing said heated fluid into contact with a waste material in a waste treatment zone, thus obtaining vapors containing vaporous material stripped by said heated fluid from said waste material, heating a portion of the vapors obtained to provide at least a portion of said fluid which is heated, obtaining in and removing from said zone a residue, passing said residue to a heating zone, and in said zone heating said residue using another portion of said vapors obtained. Some of the vapors which are obtained or stripped from the waste material can be cooled, condensed and at least a portion of the non-condensed vapor can be used as at least a portion of the fluid which is heated and later used as stripping fluid.

Still further, according to the invention, there are provided apparatus means, in combination, comprising a concentrator means or vessel, means in the bottom of said vessel for admitting thereinto a heated fluid adapted to strip waste material in the bottom of said vessel, means at the foot of said vessel for removing stripped waste material therefrom, means operatively communicating with said means for removing waste material from the bottom of said vessel for agitating and/or conveying said removed waste material while heating the same and means for removing hot vapor from said vessel and passing said vapors into heat exchange relationship with said removed treated waste material. In a specific embodiment of the apparatus, there are provided a concentrator vessel, means in said concentrator vessel for contacting a hot stripping fluid, such as steam or vapors as later removed from said vessel, with material in the bottom of said vessel, means for removing treated material from the bottom of said vessel, for example, a chamber having a valved inlet and a valved outlet or locked chamber, means in valved communication with said locked chamber comprising a heated drier-conveyor, a conduit at the top of said vessel through which the vapors therein can be removed and circulated to said drier in indirect heat exchange with the material being conveyed therein, means for compressing vapors obtained from the top of said vessel and passing these through a heater and then into the bottom of said vessel. In a more specific embodiment, the vapors from the top of the vessel are passed through a provided thermocompressor for reasons appearing herein. In a still further embodiment of the apparatus, there is provided for the expanded vapors a cooler in which the vapors are condensed and suitable piping to pipe the condensed stream of vapors to a phase separator in which uncondensed gases or vapors are removed from an oily and water phase which separates. The separator is equipped with a swing line, if desired, to remove substantially only oil or water or both, as desired. There is also provided a pump for passing vapors vented from the separator to the heater in which gases obtained from the concentrator vessel are heated. In a preferred form, the pump admixes these vapors with steam which is being fed to the thermocompressor. When there is a sufficient volume of vapors obtained from the separator, these can be used to power the thermocompressor, in lieu of steam or other fluid ordinarily used.

Referring now to the drawing, 1 is a concentrator vessel in which there is contained a mixture of waste materials from oil refinery operations consisting principally of slop-oil emulsions. This waste is pumped into vessel 1 by way of pipe 2. The waste material can be pumped continuously or intermittently, depending upon the quality of product desired. Steam is passed by way of pipe 3, thermocompressor 4, pipe 5, furnace 6, and pipe 7 into concentrator 1. The steam is passed into the waste material in concentrator vessel 1 by means of a plurality of nozzles indicated at 8. The steamed waste material passes the nozzle structure downwardly to the bottom of vessel 1. The temperature in the bottom of the concentrator is maintained in this embodiment of the invention at a temperature in the range of 240 to 750° F. The pressure in the concentrator is maintained in the range of from about 30 to 50 p.s.i.g. in order to increase the steam or vapor density. Vapors, which are evolved from the waste material either through stripping or by means of decomposition of some of the said material constituents, pass upwardly through mist extractor 9 and pipe 10 into pipe 11. A portion of the vapors pass from pipe 11 into thermocompressor 4 in which they are compressed and passed by way of pipe 5, heater 6 and pipe 7 into vessel 1 as a combined steam-stripped vapors heated fluid heating or stripping stream. Another portion of the vapors in pipe 11 is passed by way of pipe 14 into the heating jacket 15 of a screw conveyor 16 into which bottoms from vessel 1 are passed by way of valve 17, lock chamber 18 and valve 19. In the heated screw conveyor, the concentrated waste material is agitated, conveyed and dried so that a dried product can be and is obtained at 20. A steam trap 21 is provided to ensure that the drier is heated throughout its entire length by steam by removing water of condensation. In a modified operation, at least a portion of the vapors in pipe 13 are passed by way of cooler 22, pipe 23 into phase and gas separator 24. In separator 24, oil and water separate as phases and can be removed from the separator by means of swing line 25. Vapors are vented by way of pipe 26. According to a feature of the invention, vapors removed by way of vent 26 can be passed by way of pump 27 and pipe 28 to the inlet of thermocompressor 4. When a sufficient amount of vapors is being taken off by way of vent 26, these vapors can be used to actuate thermocompressor 4, to the substantial, if not complete, exclusion of steam.

It will be seen that the method and apparatus according to the invention are extremely simple in operation and comprise certain features which make for great economy. The features of using vapors or gases generated in situ to actuate the thermocompressor and/or to provide the heating fluid for stripping the waste material in the concentrator are especially noted now. Also noted are the features of maintaining a high density steam and vapor in the concentrator part of the apparatus for purposes of heating the heated drier and conveyor. Although the feature of recovering separately oil and water, following the cooler, is considered a part of the invention only so far as it coacts with the principal features thereof, the feature of removing the gases through vent 26 and using these at least in part, if not entirely, as actuator for the thermocompressor is considered to be a great contributor to the economy and simplicity of operation of the invention.

It will be noted that it is a highly superheated vapor which is released from the perforated pipes in the bottom of the concentrator and this vapor heats and distills the liquid by direct contact. Depending upon the waste material, its nature and the temperature of operation, decomposition of at least a portion thereof is contemplated. Vapors from the liquid are removed upward through a mist extractor, as described. This mist extractor can consist of baffles or equivalent equipment. The vapors are divided, as described, with a portion escaping through a pressure relief valve so that they are either condensed and settled or used for heating the steam jacket of a conveyor-drier. The portion not removed from the system but returned to the heater will usually comprise about one-half to about two-thirds of the total vapors in the system. This portion is boosted in pressure by the thermocompressor and superheated in the furnace before it is returned to the concentrator, as described. The use of the thermocompressor considerably reduces maintenance problems, especially when corrosive gases are present. A centrifugal blower can be used, in some cases, to save outside steam. It has been noted that the outside steam can be reduced when making use of the vapors from vent 26. To further save expenses, the heater coil or pipes can be suspended in an existing furnace, for example, in the convection section thereof. If desired, a portion of superheated fluid from furnace 6 can be passed by way of line 30 into the heated drier and conveyor unit to contact the material therein.

The invention is applicable, as noted, to steam distilling of slop-oil emulsions and is also applicable to spilled material obtained in the refinery or in other operations. Oil contained in the emulsion is recovered in substantially clean condition for recharging to oil treating means. The solids or dirts which are removed and concentrated are obtained in substantially dry condition and can be used for fills or for spreading on roads. Separator bottom sludges, tank bottom emulsions and some other bottoms or waste materials in the refinery can be similarly treated. Concentration and crystallization to a slurry or to dry crystals can be obtained in drier 16 which is suited to concentrate further and to crystallize chemical treating or scrubbing solutions of various types which have been concentrated in vessel 1. For example, sodium sulphide solutions for sale to paper companies can be concentrated by the method and apparatus of the invention thereby reducing shipping charges over those of present dilute solutions. Also, sodium fluorides can be concentrated and cleaned to a point at which solutions or dry crystals thus obtained can be sold to water treating plants.

The process of this invention may be operated either as a batch or as a continuous process. The following specific example is illustrative of a continuous operation. In the example, for sake of simplicity, there is no return of vapors from vent 26 back to thermocompressor 4. Further, any interface emulsion that is present in tank 24 is not being returned to the feed 2, and is not shown on the drawing for the sake of simplicity, although such recycle when emulsion is present is within the scope of this invention. Further, for the sake of simplicity, the drawing does not shown the flow of condensate from trap 21 to tank 24. The vapors produced in the heated drier and conveyor are recovered and may be combined with the product in line 13 or line 23, upstream or downstream of condenser 22, such step not being shown in the drawing for the sake of simplicity. A compressor may be used to pass these vapors to the overhead product from the concentrator 1.

SPECIFIC EXAMPLE

A slop-oil emulsion stream collected from plant spills, wastes, etc., is charged at ambient temperature by way of line 2 to contactor 1. Superheated steam is introduced by way of lines 3 and 7 at 700° F. to maintain the contactor 1 bottoms temperature at 260° F. Pressure maintained in the bottom of the contactor 1 is 35 p.s.i.g. In the upper zone of contactor 1, above mist extractor 9, the pressure is about 25 p.s.i.g. and the overhead is removed by way of line 10 at 245° F. A portion of this overhead 10 is recycled by way of line 11 to the contactor 1. In the specific example, the ratio of recycle 11 to yield 13 is 1 to 1. A portion of the overhead yield 13 is utilized to heat the heated drier and conveyor, being introduced into jacket 15. In the specific example, this quantity is one-third of the yield in line 13. This stream passed by way of line 14 to jacket 15 further heats the solids material in the heated drier and conveyor. This solids material entering the heated drier and conveyor by way of valve 19 is flashed from 35 p.s.i.g. and 260° F. to atmospheric pressure and 215° F. in the heated drier and conveyor. The heating fluid in line 14 and jacket 15 is condensed in jacket 15 and releases its latent heat to further dry these bottoms solids material. Vapor produced in the heated drier and conveyor are ultimately recovered in tank 24. This is accomplished by passing vapors from within the heated dryer and conveyor by way of pipe 31 to pipe 13 ahead of the water cooler. The combined vapor streams from the overhead of contactor 1 and from the heated drier and conveyor are recovered in tank 24 wherein a light vapor phase, a liquid oil phase, and a water phase develop. As stated above, any emulsion phase may be removed and recycled to the feed in line 2 or directly to contactor 1, not illustrated in the drawing.

Oil product is recovered by way of line 25 and solids are recovered by way of line 20.

*Tabulation*

Waste feed (2):
  Composition (as liquid)—
    Oil, vol. percent _____ 54
    Water, vol. percent _____ 39
    Solids, including salts, vol. percent _____ 7
Overhead product yield (23):
  Composition (as liquid)—
    Oil, vol. percent _____ 27.2
    Water, vol. percent _____ [1] 72.8
    Solids, vol. percent _____ nil

[1] Includes added steam.

Volume percents are obtained from B.S. and W. (bottom sediment and water) type measurement using an emulsion breaker on the sample so that volume percent of solids, of water, and of oil can be measured.

Solids yield (20):
  Composition—
    Oil, vol. percent _____ 20
    Water, vol. percent _____ 10
    Solids, vol. percent _____ 70
Oil products (25):
  Composition—
    Oil, vol. percent (29.4 API 60/60) ____ 99.6
    Water, vol. percent _____ 0.4
Rates of flow:
  Waste feed, line 2, #/hr. _____ 1000
  Steam, line 3, #/hr. _____ 1000
  Overhead, line 23, #/hr. _____ 1267
  By-pass, line 14, #/hr. _____ 633
  Solid yield, line 20, #/hr. _____ 100
  Oil product, line 25, #/hr. _____ [1] 522

[1] Includes 0.4 volume percent water.

Reasonable variation and modification are possible within the scope of the foregoing disclosure, the drawing and the appended claims to the invention, the essence of which is that there have been provided a method and apparatus for treatment of waste materials, the method comprising heating a stripping fluid, passing the stripping fluid into contact in a concentration zone with waste material, removing vapors from the concentration zone, cooling, condensing and phase separating at least a part of the said vapors, when desired; passing a remaining portion of vapors, preferably under pressure, through a heating zone to provide the heated stripping fluid for the concentration zone, removing concentrated waste from the stripping zone and passing the same into heat exchange relationship with hot vapors in the system to further concentrate and to dry said removed waste material, and, when desired, using gases or vapors obtained from the condensed vapors as motive fluid for the operation of a provided thermocompressor, as described; the apparatus consisting essentially of heating means, concentrator means, heated drier-conveyor means, and means cooperating therewith to provide a stripping fluid in the concentrator means, to heat the stripping fluid in the heating means, to pump vapors from the concentrator means through the heating means to the concentrator means, means for removing waste material from the concentrator means and heating, drying and conveying the same in heat exchange relationship with the vapors, as described, and cooler means and phase and vapor separator means also substantially as described.

I claim:
1. A method for the recovery of products from wastes which comprises heating a fluid to a temperature at which it will vaporize a vaporizable portion later mentioned herein, passing said heated fluid into a waste-treating zone into contact with a liquid phase waste material containing a heat-vaporizable portion, thus obtaining vapors containing vaporous material stripped by said heated fluid from said waste material, heating a portion of the vapors obtained to provide at least a portion of said heated fluid which is passed into said treating zone, continuing heating said waste material in said heating zone by passing said heated fluid therethrough until a substantially solid residue is obtained, removing said substantially solid residue from said treating zone and cooling same, passing said substantially solid residue to a heating and conveying zone, in said last-mentioned zone heating said residue using another portion of said vapors obtained, and passing vapors evolved from said heating and conveying zone to further treatment for separation of condensible liquid therefrom.

2. A method of treating liquid waste material containing a heat vaporizable portion to obtain a dry, readily handled concentrate product therefrom which comprises:

(a) passing a stripping fluid heated to a temperature at which it will vaporize said portion through said material in liquid phase, thus obtaining a substantially solid concentrate, (b) passing a first portion of the vapors, obtained by passing said heated fluid through said material, into heat exchange relationship with said substantially solid concentrate, said first portion of the vapors and said concentrate during said heat exchange being at respective temperatures such that heat will pass from said vapors to said concentrate, (c) cooling and partially condensing a second portion of the vapors, obtained by passing said heated fluid through said material, said second portion containing components of different vaporizing temperatures, and (d) utilizing at least a portion of the resulting non-condensed vapors of step "c" as at least a portion of the stripping fluid heated and passed in step "a."

3. An apparatus for treating waste materials comprising, in combination, means as follows: a concentrator vessel; means for introducing into the bottom of said concentrator vessel below a liquid level of said waste materials therein a heated stripping fluid; means for heating said stripping fluid and means for discharging said heated stripping fluid from said means for heating into said means for introducing; means for agitating, conveying, heating, and drying substantially solid concentrate or waste material; means for removing substantially solid concentrated material from said concentrator vessel and passing the same to said means for agitating, conveying, heating, and drying; means for removing vapors from said concentrator vessel; means for passing at least a portion of said vapors to said means for heating; means for passing at least another portion of said vapors to said means for agitating, conveying, heating, and drying; cooling means; phase separator means; means for passing vapors from said vessel through said cooling means and into said phase separator means; and means for removing phases separately from said phase separator means.

4. An apparatus for treating waste materials comprising, in combination, means as follows: a concentrating vessel, means for introducing into the bottom of said concentrator vessel below a liquid level of said waste materials therein a heated stripping fluid, means for heating said stripping fluid and means for discharging said heated stripping fluid from said means for heating into said means for introducing, means for agitating, conveying, heating and drying substantially solid concentrate or waste material, means for removing substantially solid concentrated material from said concentrator vessel and passing the same to said means for agitating, conveying, heating, and drying, means for removing vapors from said concentrator vessel, means for passing at least a portion of said vapors to said means for heating, means for passing at least another portion of said vapors to said means for agitating, conveying, heating and drying, and means on said means for agitating, conveying, heating and drying for transferring vapors evolved in agitating, conveying, heating and drying the waste material to further treatment for separating condensible liquid from said vapors.

References Cited in the file of this patent
UNITED STATES PATENTS

| | | |
|---|---|---|
| 1,451,129 | Van Dyke | Apr. 10, 1923 |
| 1,594,957 | Howard et al. | Aug. 3, 1926 |
| 1,607,206 | Neill | Nov. 16, 1926 |
| 2,142,983 | Thurman | Jan. 3, 1939 |
| 2,190,615 | Thurman | Feb. 13, 1940 |
| 2,357,649 | Hall | Sept. 5, 1944 |
| 2,561,394 | Marshall | July 24, 1951 |
| 2,566,223 | Mackay | Aug. 28, 1951 |
| 2,636,555 | Klepetko | Apr. 28, 1953 |
| 2,769,489 | Eckstrom | Nov. 6, 1956 |
| 2,823,742 | Ludin et al. | Feb. 18, 1958 |

UNITED STATES PATENT OFFICE
CERTIFICATE OF CORRECTION

Patent No. 3,084,107                                April 2, 1963

Martin E. McMahon

It is hereby certified that error appears in the above numbered patent requiring correction and that the said Letters Patent should read as corrected below.

Column 6, line 63, for "heating", second occurrence, read -- treating --.

Signed and sealed this 10th day of December 1963.

(SEAL)
Attest:

ERNEST W. SWIDER

Attesting Officer

EDWIN L. REYNOLDS

Acting Commissioner of Patents